US005676980A

United States Patent [19]
Gulka et al.

[11] Patent Number: 5,676,980
[45] Date of Patent: Oct. 14, 1997

[54] CENTER SPLIT SEGMENTED MOLD FOR CURING PNEUMATIC TIRES

[75] Inventors: Ronald J. Gulka, N. Canton; Edward C. Sebak, Canton; Neal Sehm, Akron, all of Ohio; James C. Storch, Charlotte, N.C.; John T. Taylor, Tega Cay; James Tully, Clover, both of S.C.

[73] Assignee: Continental General Tire, Inc., Charlotte, N.C.

[21] Appl. No.: 535,990

[22] Filed: Sep. 29, 1995

[51] Int. Cl.$^6$ .................................................. B29C 35/02
[52] U.S. Cl. .................................................. 425/40; 425/46
[58] Field of Search ........................... 425/36, 40, 43, 425/46, 47

[56] References Cited

U.S. PATENT DOCUMENTS

| | | | |
|---|---|---|---|
| 3,778,203 | 12/1973 | MacMillan | 425/20 |
| 3,787,155 | 1/1974 | Zangl | 425/47 |
| 3,806,288 | 4/1974 | Materick | 425/47 |
| 4,013,390 | 3/1977 | Moeller et al. | 425/46 |
| 4,022,554 | 5/1977 | MacMillan | 425/23 |
| 4,025,250 | 5/1977 | MacMillan | 425/17 |
| 4,181,482 | 1/1980 | Grawey et al. | 425/46 |
| 4,289,463 | 9/1981 | Le Moullac | 425/47 |
| 4,553,918 | 11/1985 | Yoda et al. | 425/46 |
| 4,957,676 | 9/1990 | Greenwood | 264/102 |
| 5,120,209 | 6/1992 | MacMillan | 425/46 |
| 5,208,044 | 5/1993 | Miyata et al. | 425/32 |
| 5,223,065 | 6/1993 | Kogure | 425/46 |
| 5,234,326 | 8/1993 | Galli et al. | 425/46 |

FOREIGN PATENT DOCUMENTS

250708  1/1988  European Pat. Off. ............... 425/46

*Primary Examiner*—James P. Mackey
*Attorney, Agent, or Firm*—Calfee Halter & Griswold LLP

[57] ABSTRACT

A center split, segmented mold for curing a complete tire is provided, comprising a mold container top containing a top mold sidewall plate and a plurality of top tread segments disposed generally equidistant from a central axis and adjacently abutting each other when the mold is in a closed position; and a mold container bottom containing a bottom mold sidewall plate and a plurality of bottom tread segments disposed generally equidistant from the axis and adjacently abutting each other when the mold is in a closed position. Each of the top and bottom tread segments are resiliently biased toward the mold centerline by spring mechanisms, and are slidably coupled to respective frustoconical surfaces of the mold container, such that vertical movement of the mold container top along the axis from a closed position to an open position is translated into outward radial movement of the top and bottom tread segments away from the axis. The top and bottom tread segments mate when the mold is in the closed position in a plane which may be offset from the mold centerline. The top mold sidewall plate mates with the top tread segments and the bottom mold sidewall plate mates with the bottom tread segments at respective seating joints which limit inward radial movement of the top and bottom tread segments toward the axis. Pin assemblies for each tread segment limit outward radial movement of the tread segments away from the axis.

13 Claims, 7 Drawing Sheets

CENTER SPLIT SEGMENTED MOLD FOR CURING PNEUMATIC TIRES

FIELD OF THE INVENTION

The present invention relates generally to molds for completely curing pneumatic tires and more particularly to a tire mold which is both (i) radially segmented about its circumference and (ii) split into top and bottom halves.

BACKGROUND

In the construction of pneumatic tires, various uncured tire components are assembled together sequentially around a tire building drum and shaped around the drum into the desired toroidal form of the tire. The shaped uncured tire is then cured for strength and durability. Tire molds are used in the curing process to give a tire its final shape and appearance and to vulcanize the components of the tire.

Tire molds for curing complete tires are generally of two types: clamshell molds and segmented molds. With each type of mold, heated exterior components of the mold are moved into contact position with the tread and sidewall portions of the uncured tire and cure the tire from the outside. A heated bladder is inflated to contact the inner surface of the tire to help shape and cure the tire from the inside.

Figure 1A:
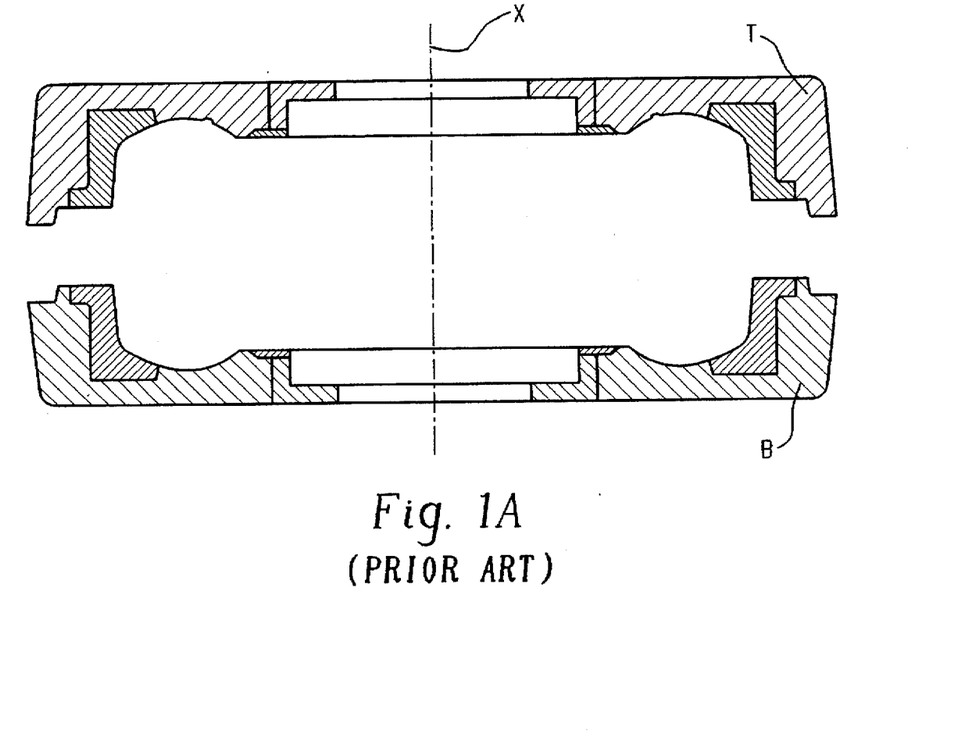
FIGS. 1A and 1B are sectional side views of a prior art clam shell tire mold, shown in the open and closed positions, respectively.
Figure 1B:
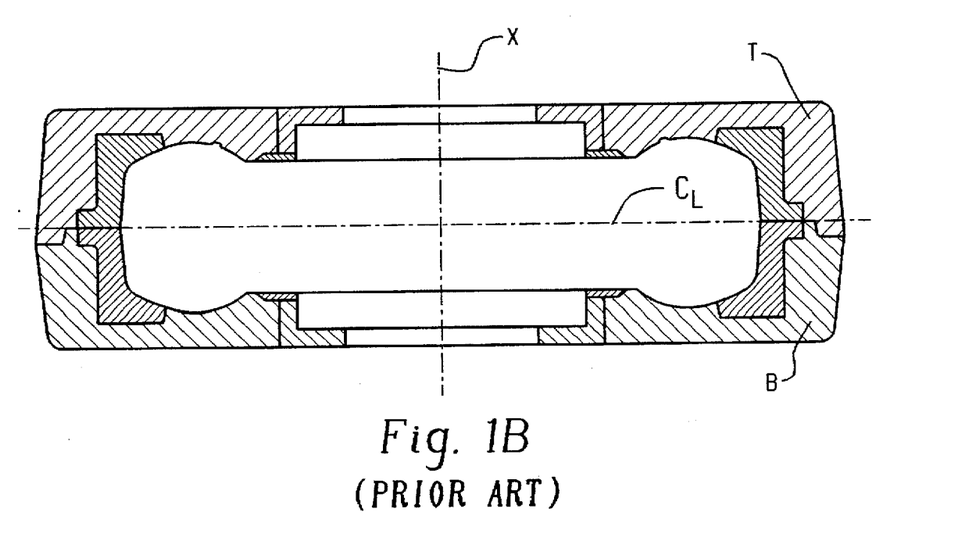

An example of a clamshell mold is shown in U.S. Pat. No. 4,957,676 to Greenwood. Another example of a clamshell mold is shown in FIGS. 1A and 1B, wherein the mold comprises a top half T and a bottom half B located on either side of a plane which runs through the centerline $C_L$ of the tread pattern around the circumference of the tire. FIG. 1A shows the clamshell mold in an open position and FIG. 1B shows the clamshell mold in a closed position.

Clamshell molds are proven, reliable, and relatively inexpensive to manufacture. Another benefit of clamshell molds is that a significant portion of the mold (typically the bottom half B) may remain stationary as only the top half needs to be raised and lowered with respect thereto by a press, along an axis of rotation X of the tire, to open and close the mold. Such operation saves wear and tear on the press operating to open and close the mold.

However, clamshell molds suffer from several drawbacks. For example, they are not appropriate for curing some types of tires, for example, radial tires with a low aspect ratio (sidewall-to-tread width ratio) or radial tires having deep non-skid (tread) depths. In addition, when using a clamshell mold, the uncured tire must be approximately smaller than the cured tire in order to be effectively loaded into the mold.

Figure 2A:
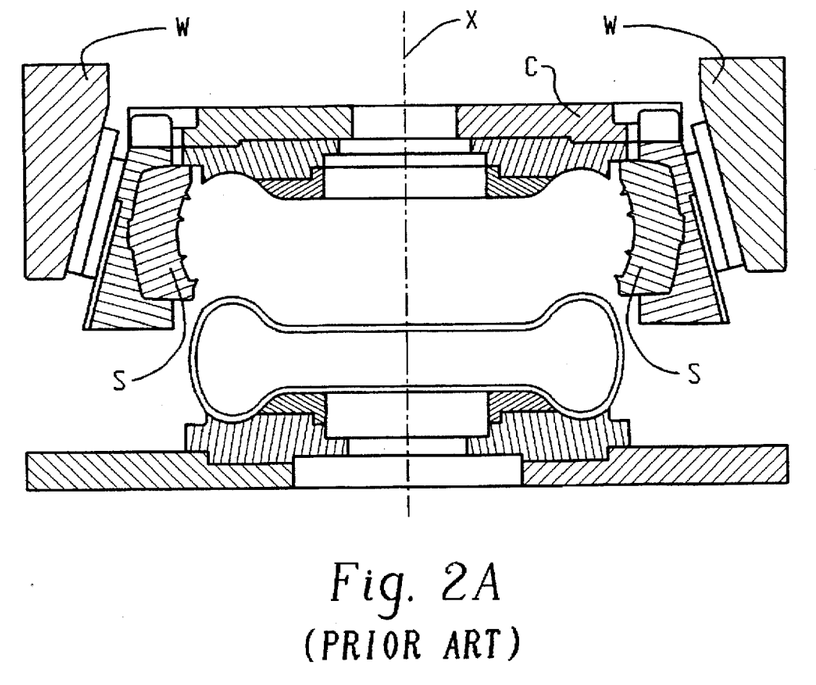
FIGS. 2A and 2B are sectional side views of a prior art segmented tire mold, shown in the open and closed positions, respectively.

Another type of tire mold is the segmented mold, shown in FIGS. 2A (open position) and 2B (closed position). Examples of segmented tire molds are also shown in U.S. Pat. No. 3,787,155 to Zangl and U.S. Pat. No. 3,806,288 to Materick. Unlike clamshell molds, which are split about the centerline $C_L$ of the tread pattern, segmented molds are radially segmented into a plurality of arcuate tread segments S about the circumference of the mold. Each of the segments is attached to a top portion of a mold container C so that when the top container portion C is lowered and raised by a press in which the container is installed, the mold segments S correspondingly move up and down along the axis of rotation X. In this direction, movement of the segments corresponds generally to that of the top portion T of the clamshell mold of FIGS. 1A and 1B.

Figure 2B:
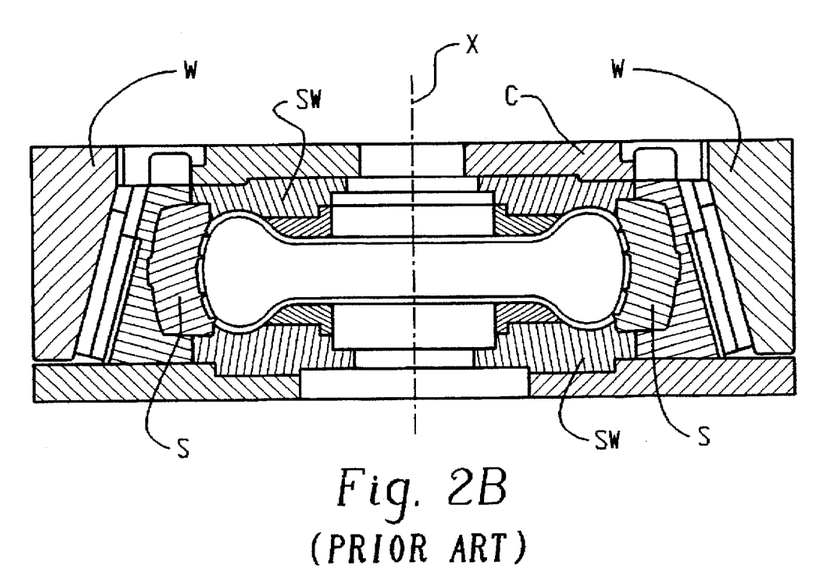

Because the segmented mold is not split into top and bottom halves like a clamshell mold, however, the segments S also need to be able to move radially inward and outward toward and away from the axis of rotation X in order to provide clearance for installing and removing the tire. For this purpose, the mold segments S are slidably mounted to the top portion C of the mold container to allow mating with sidewall-curing portions SW of the mold, typically by a T-slot track, to permit radial movement of the segments with respect to the container top portion. The means of imparting this radial movement to the segments is provided by cone ring W which are attached to each of the segments S, again typically by T-slot tracks.

Vertical movement of the cone ring up and down along the axis of rotation X by the press is translated into outward and inward radial movement of the segments, respectively, with respect to the top portion of the container. To remove a tire being cured in the mold, the segments must be moved sufficiently radially outward so that the entirety of the segments completely clears the outermost diameter of the tire when the upper portion of the container is raised. Merely moving the segments radially outward a distance corresponding to the tread depth, as is possible with the inventive center split segmented mold, is insufficient to enable removal of the tire.

In operation, the segmented mold in its open position (FIG. 2A) provides sufficient clearance to install an uncured tire therein. The top portion C of the container is moved downward during a first stage of press operation, while the segments maintain their radially outward open (expanded) position. The cone ring W is then driven downward during a second stage of press operation, causing the segments to move radially inward into their closed (contracted) position (FIG. 2B).

With the above type of segmented mold arrangement, a single stage press operation could be employed. However, in such a case, the downward movement of the top portion C of the container and the cone ring W would need to be precisely coordinated to prevent damage to the segments S, which are operatively connected to both the top portion of the container and the cone ring. Moreover, if a single stage press operation is employed, the segments would need to be positioned further radially outward in their open expanded position, because they will immediately begin moving radially inward upon the downward movement of the cone ring.

The above construction of a segmented mold, while providing applications for curing a wider variety of types of tires, is significantly more complex in construction than a conventional clamshell mold. Moreover, the press in which the mold is installed must normally provide for both the opening and closing operation of the press, as well as a mechanism for extending and retracting the mold segments. To install a conventional segmented mold in a press, the press typically must be modified to provide the extending/retracting mechanism. In addition, the press must be able to withstand repeated raising and lowering of a significant majority of the weight of the mold and the container.

In addition to the clam shell and segmented tire molds for curing complete uncured (green) tires described above, segmented tire matrixes, such as that shown in U.S. Pat. No. 3,778,203, are used in a tire retreading process to cure only the tire tread. In a tire matrix, however, only the tread segments are heated to provide a curing contact surface, and thus heat is applied to the tread area only externally. The heated tread segments do not mate with any other tire curing part of the matrix.

Accordingly, it is an object of the present invention to provide a mold for curing a complete pneumatic tire, which may be easily installed into an unmodified press, which minimizes operational wear and tear on the press, and which provides a relatively simple construction, like a conventional clamshell mold, yet provides the versatility of application like a conventional segmented mold.

SUMMARY

The present invention provides a center split, segmented mold for curing a complete tire, comprising a top mold section and a bottom mold section separated by a mold centerline. The top mold section is moveable with respect to the bottom mold section from an open position to a closed position. The top mold section comprises a container top (constructed of, e.g., steel) which contains a plurality of arcuate top tread segments arranged in a circular pattern. Each of the arcuate top segments is coupled to the container top by an alignment pin. A pair of spring assemblies force each of the arcuate top segments radially outward from a central axis when the mold is in the open position.

Similarly, the bottom mold section comprises a container bottom which contains a plurality of arcuate bottom tread segments arranged in a second circular pattern. Each of the arcuate bottom tread segments is coupled to the container bottom by an alignment pin. A pair of spring assemblies force each of the arcuate bottom segments radially outward from the central axis when the mold is in the open position.

The top mold section includes a replaceable top mold sidewall plate and the bottom mold section includes a replaceable bottom mold sidewall plate. Alternatively, the top and bottom mold sidewall plates may be made integral with the container top and bottom. The top sidewall portion mates with the top tread segments and the bottom sidewall portion mates with the bottom tread segments at respective seating joints which limit inward radial movement of the top and bottom tread segments toward the central axis. The seating joints are disposed generally normal to the surface of the tire at the location of the S-diameter of the tire.

The arcuate top tread segments and the arcuate bottom tread segments are preferably of unequal arc length, and are preferably constructed of aluminum. In the disclosed embodiment, nine top and nine bottom segments are provided. The segments meet at junctions, none of which overlie each other when the mold is in the closed position. The top and bottom tread segments mate when the mold is in a closed position in a plane which is offset from a plane containing the mold centerline. However, it is to be understood that the invention includes molds which have more or less than nine non-aluminum tread segments of equal or unequal length, which have segments which meet at junctions which overlie one another in the closed position, and which have top and bottom tread segments which mate in a plane which coincides with the mold centerline or off-centerline.

In both the top and bottom mold sections, the spring assemblies and the alignment pins are disposed in parallel but not coaxial relationship with each other. The spring assemblies each comprise a cylindrical spring surrounded by a cylindrical sleeve. One end of each of the pins is fixedly attached at a first end to the container. A second end of the pin opposite the first end limits the outward radial movement of the tread segments.

The container top and container bottom are provided with a frustoconical surface upon which slides the top tread segments and the bottom tread segments, respectively. The frustoconical surfaces are disposed generally parallel to the spring assemblies and the pins. In the preferred embodiment, the frustoconical surfaces are provided with a coating or plating, such as nickel, to facilitate slidable movement of the tread segments with respect thereto.

DETAILED DESCRIPTION OF A PREFERRED EMBODIMENT

Figure 3:
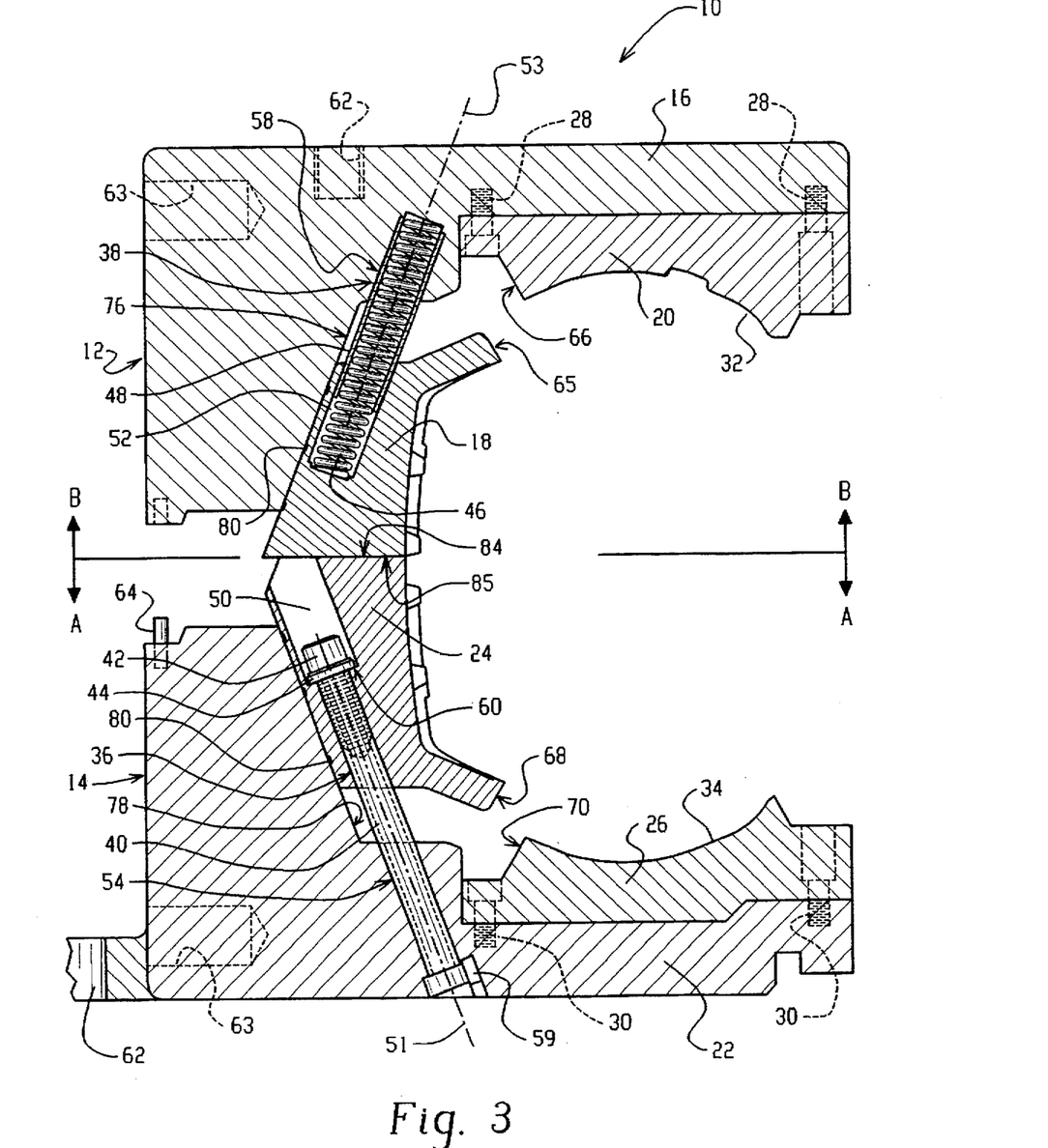
FIG. 3 is a half cross sectional view of a center split segmented mold for curing pneumatic tires, constructed according to the principles of the present invention, shown in a fully open position.
Figure 4:
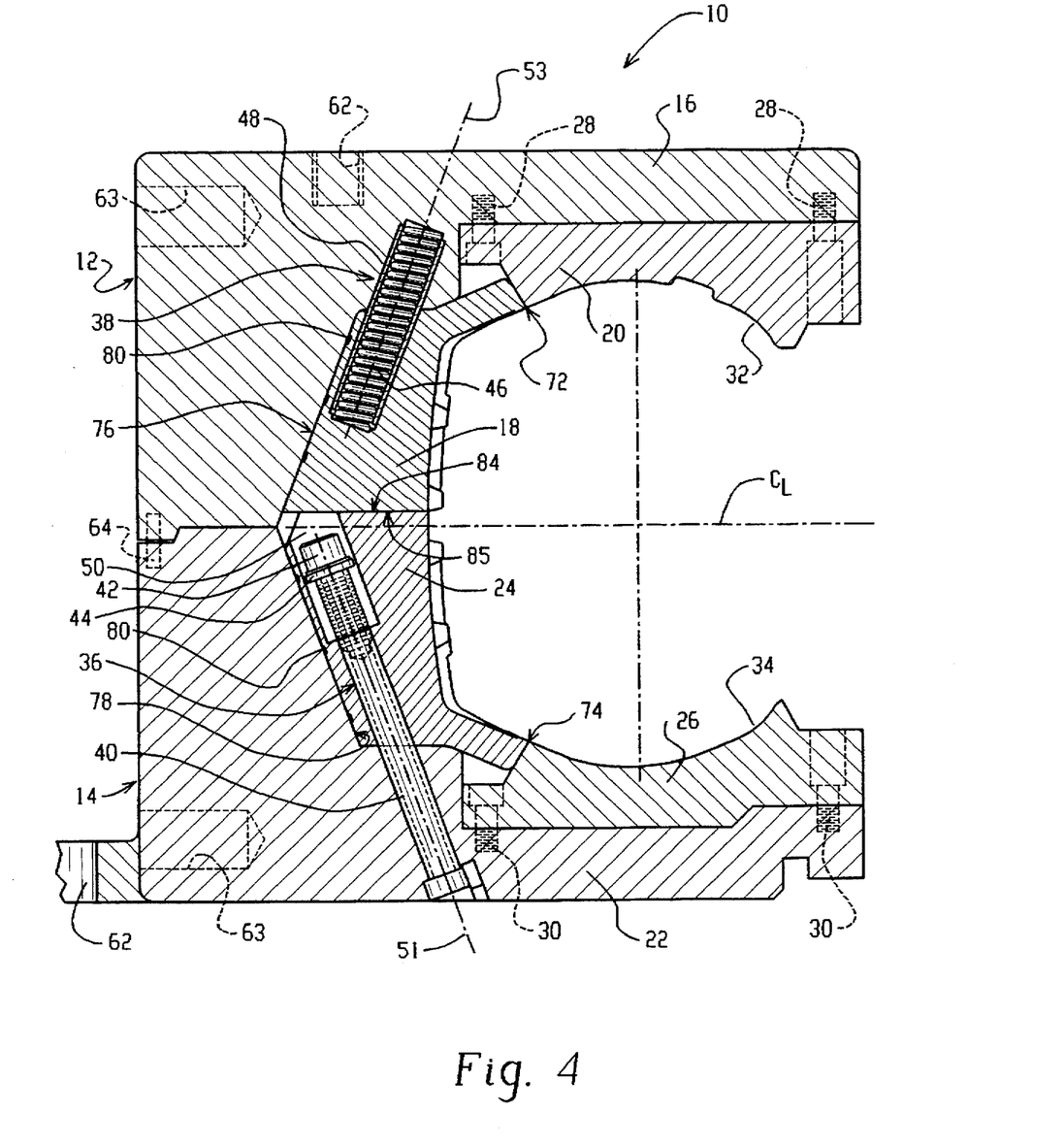
FIG. 4 is a half cross sectional view of the center split segmented mold of FIG. 3, shown in the closed position.

With reference to the drawings, FIGS. 3 and 4 each show a half cross sectional view of a tire mold 10 constructed in accordance with the principles of the present invention. FIG. 3 shows the mold in the partially open position and FIG. 4 shows the mold in the closed position. The entire mold 10 is generally toroidal in shape, corresponding to the shape of a tire to be cured therein. The other half of the mold 10 not shown in FIGS. 3 and 4 is symmetrical with respect to the axis of rotation of the tire. In other words, an entire cross sectional view of the mold 10 in a partially open position would include a mirror image of the half sectional view shown in FIG. 3, located to the right of FIG. 3 equidistant from the axis of rotation of the tire.

Unlike the conventional segmented mold of FIGS. 2A and 2B, the mold 10 of the present invention comprises a top mold section 12 and a bottom mold section 14 divided generally by mold centerline $C_L$ (see FIG. 4). The top mold section 12 comprises a mold container top 16 which contains a plurality of adjacently abutting top tread segments 18 and a top mold sidewall plate 20. The bottom mold 14 section comprises a mold container bottom 22 which contains a plurality of bottom tread segments 24 and a bottom mold sidewall plate 26. In the preferred embodiment, the mold container top and bottom are constructed of steel and the top and bottom tread segments are constructed of aluminum. Both the tread segments and the mold sidewall plates are heated, by known methods, during the curing process.

Figures 8, 9:
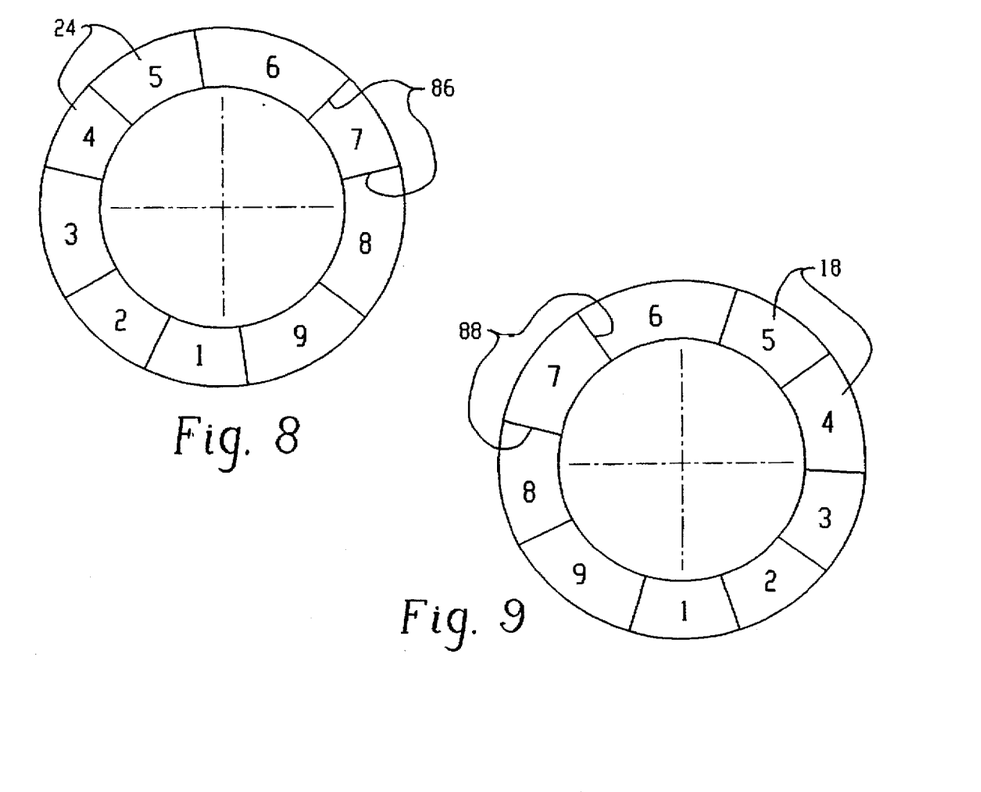
FIG. 8 is a plan view of the layout of the bottom tread segments contained within the mold of FIGS. 3 and 4, taken along the line of sight A—A of FIG. 3.
FIG. 9 is a plan view of the layout of the top tread segments contained within the mold of FIG. 3, taken along the line of sight B—B of FIG. 3.

The top and bottom tread segments 18 and 24 are arcuate (i.e., arc-shaped) and together form a circular pattern, corresponding to the shape of a tire, when positioned abutting one another (see FIGS. 8 and 9). The top and bottom tread segmentst 18 and 24, together with the top and bottom mold sidewall plates 20 and 26, form the surface to which the outside of the tire conforms during the curing process.

Figure 5:
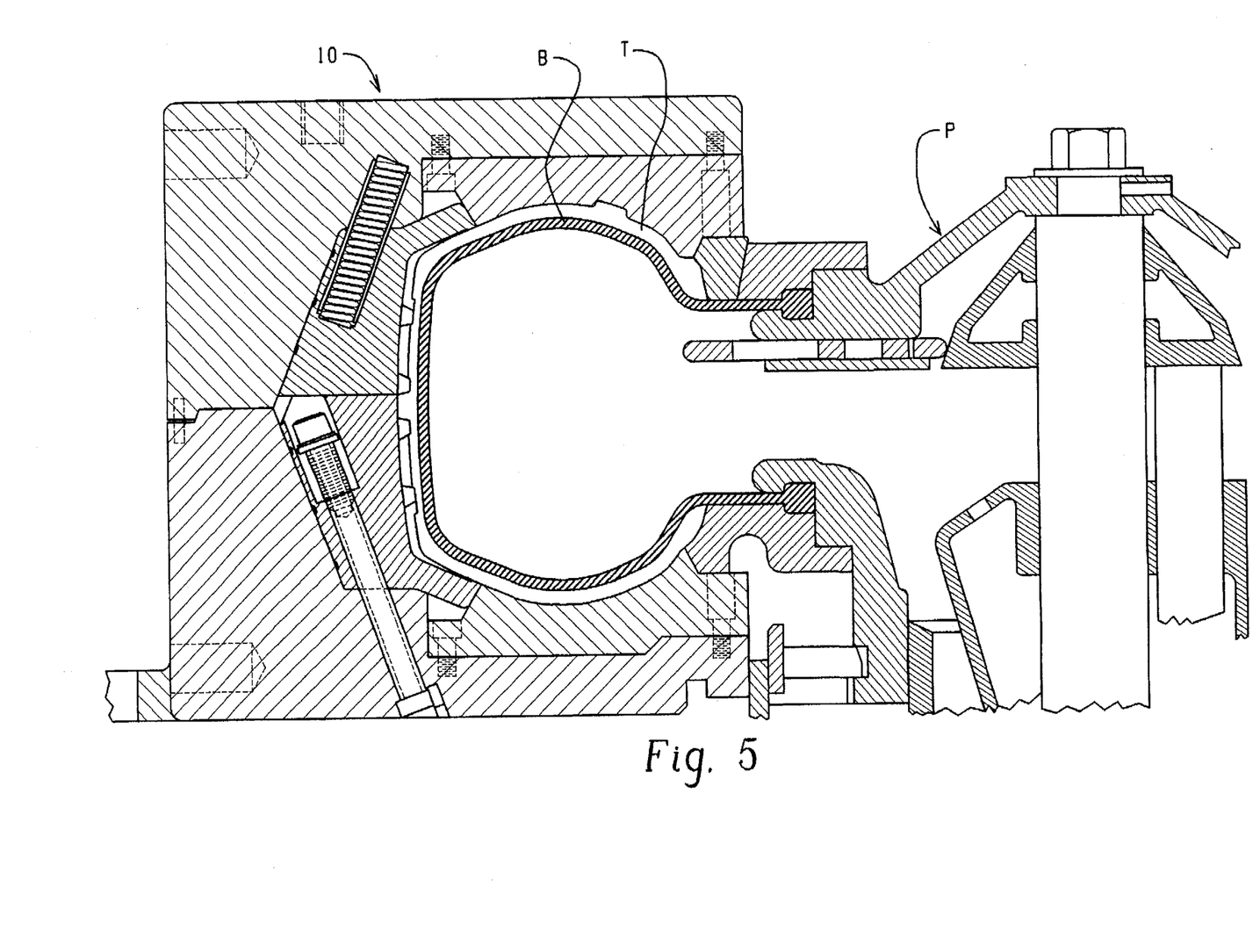
FIG. 5 is a half cross sectional view of the closed center split segmented mold of FIGS. 4, shown as installed in a press with an inflatable bladder to cure a tire contained therein.

As is known in the art, the mold 10 may be installed into a press P having an inflatable heated curing bladder B (see FIG. 5). Also as is known in the art, means to heat the mold segments are provided. The bladder is positioned within the uncured tire T and inflated to conform to the inside surface of the tire to provide heat and pressure for the interior surface of the tire during the curing process. The mold sidewall plates 20, 26 mate with the tire bead rings. Using the press/bladder/mold configuration shown in FIG. 5, the mold 10, along with the inflatable curing bladder B and the tire press P, form a pressurized heated vessel which transfers heat to the complete tire both internally (via the heated bladder) and externally (via the heated tread segments and mold sidewall plates), to cure the individual tire components into an integral tire.

The top mold sidewall plate 20 is fixedly attached to the mold container top 16 by suitable means such as bolts 28. The bottom mold sidewall plate 26 is similarly fixedly attached to the mold container bottom 22 by suitable means such as bolts 30. Inner surfaces 32 and 34, respectively, of the top and bottom mold sidewall plates 20 and 26 may be provided with features which are impressed upon the sidewalls of the tire during curing in the mold 10. The top and bottom mold sidewall plates may be replaced with mold sidewall plates having differently contoured inner surfaces, if desired, to change the features impressed upon the tire sidewalls. Alternatively, non-replaceable mold sidewall plates may be made integral with the mold container top and bottom.

Each of the top tread segments 18 and each of the bottom tread segments 24 is slidably mounted to the mold container top 16 and mold container bottom 22, respectively, by means of a pin assembly 36 and a pair of spring assemblies 38 located on either side of the pin assembly. Each of the pin assemblies 36 comprises a guide pin 40 having internal threads, a threaded socket head cap screw 42 which is screwed into the threaded guide pin, and a hardened steel washer 44. The pin assemblies 36, as will be explained in further detail later herein, prevent the tread segments from sliding off of the guide pins 40 when installed thereon.

Each of the spring assemblies 38 comprises a cylindrical steel spring 46 and a surrounding cylindrical stainless steel spring sleeve 48. The steel spring sleeves are primarily used as a shield against dirt and particulate matter which might otherwise accumulate about the coils of the springs. The spring assemblies, also as will be explained later herein, provide a biasing force which urges the top and bottom tread segments into the position shown in FIG. 3 when the mold is partially opened.

To the extent that both a spring assembly 38 and a pin assembly 36 are shown in FIGS. 3 and 4, these Figures are not true cross sectional views of the mold. A true cross sectional view would show one or the other of the pin assembly 36 or the spring assembly 38 in phantom. The views shown in FIGS. 3 and 4 are provided only to present a clearer representation of the construction of the mold 10.

Figure 6:
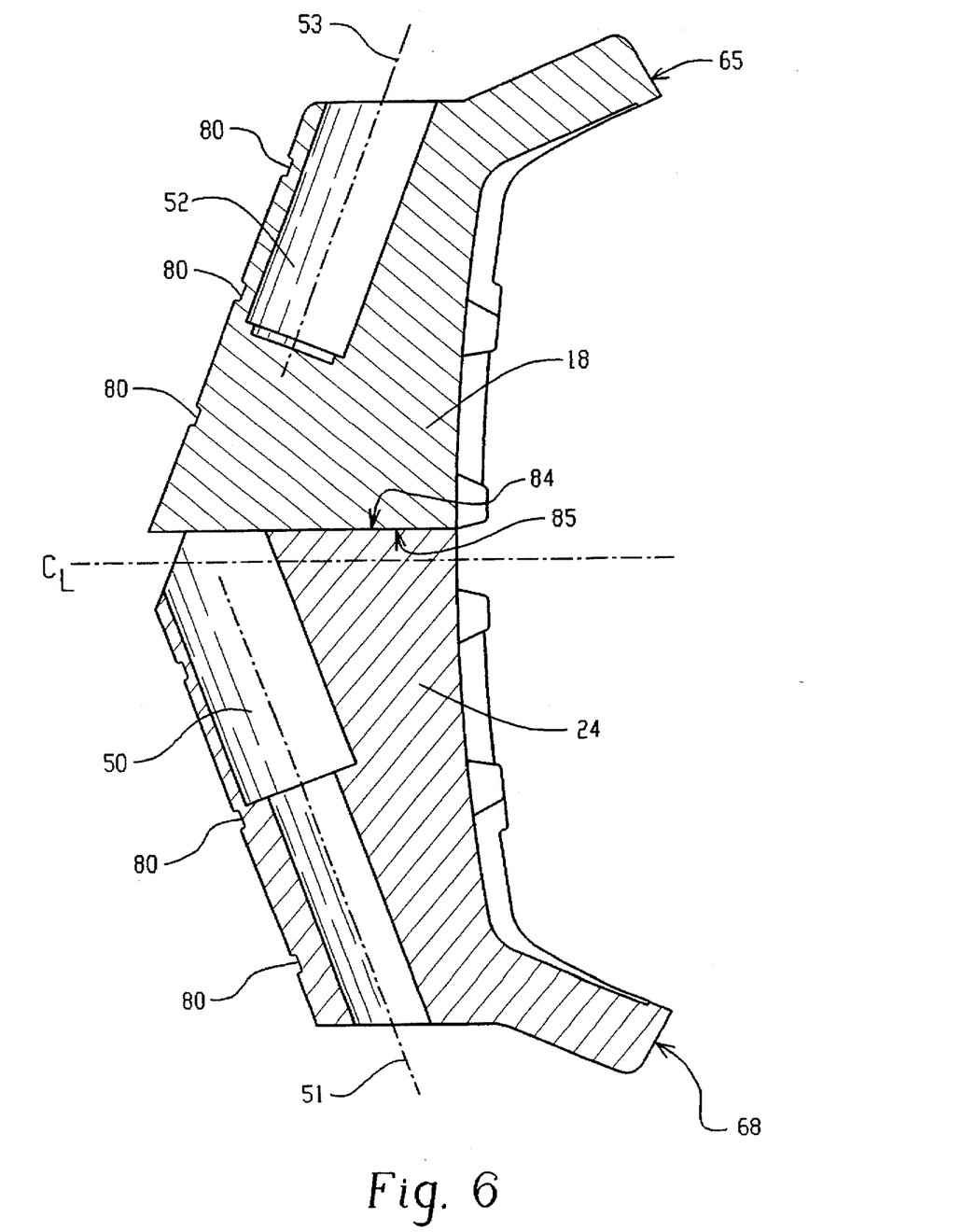
FIG. 6 is a more detailed cross sectional view of the top and bottom tread segments shown in the molds of FIGS. 3 and 4.
Figure 7:
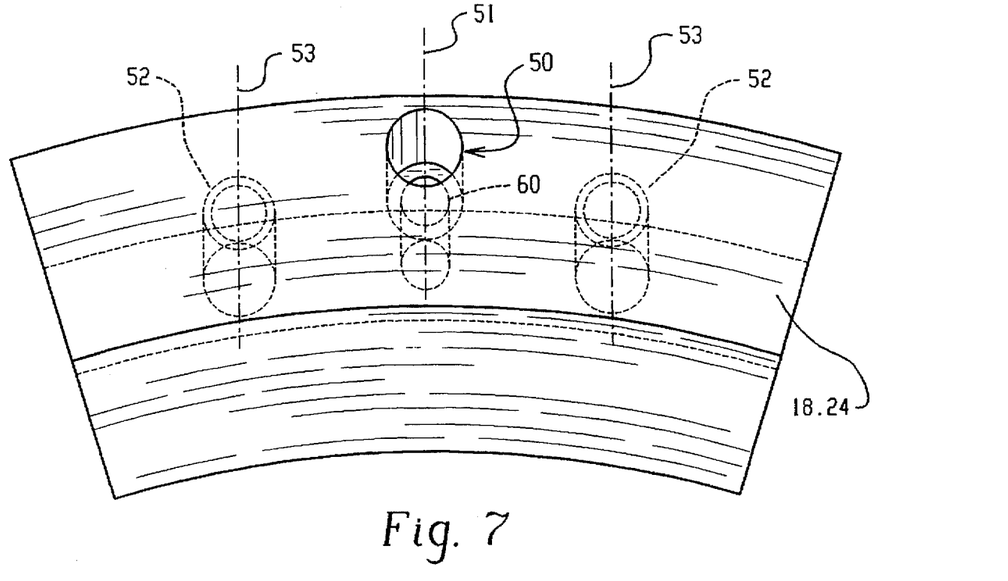
FIG. 7 shows a view of a top or bottom tread segment of FIG. 6, taken along the line of sight A—A (for a bottom segment) of FIG. 3 or along the line of sight B—B (for a top segment) of FIG. 3.

FIGS. 6 and 7 more clearly illustrate the positions which the pin assemblies 36 and the spring assemblies 38 assume within the top and bottom tread segments 18 and 24. Each of the tread segments is provided with a central cylindrical pin cavity 50 centered between two identical cylindrical spring cavities 52. Cavity 50 is drilled about axis 51 and cavities 52 are drilled about axes 53 into the tread segments. Axis 51 and axes 53 are parallel to each other and disposed at an angle of about 20° from axis Y, which is perpendicular to the centerline $C_L$ of the mold and parallel to the axis of rotation of the tire (see FIG. 6).

The central pin cavity 50 is drilled entirely through each of the top and bottom tread segments (see FIG. 3). An extension 54 of the pin cavity 50 is provided in the mold container bottom (and top) through which the pin 40 extends. The spring cavities 52 are drilled only partially through the top and bottom tread segments. As shown in FIG. 3, an extension 58 of the cavity is provided in the mold container top (and bottom) through which the spring 46 and sleeve 48 of the spring assembly 38 extend.

To assemble the mold 10, the top and bottom mold sidewall plates 20 and 26 are fixedly attached to the mold container top and bottom 16 and 22, respectively, as described above. Pins 40, one for each of the top and bottom tread segments, are fixedly installed in the cavity extensions 54 in the mold container top 16 and bottom 22, for example, using socket head screws (not shown). A locking device such as a roll pin 59 prevents these screws from loosening. A pair of spring assemblies 38, each comprising sleeve 48 and spring 46, are installed on either side of each of the pins 40 in the cavity extensions 58 in the mold container top 16 and bottom 22.

The top tread segments 18 are aligned with the mold container top 16 so that the spring assemblies 38 align with the cavities 52 and the pin assembly 36 aligns with the cavity 50 in each of the top tread segments. The top tread segments are then slid over the spring assemblies and the pin assemblies. Washers 44 are then placed at the threaded ends of the pins 40 so that they overlie the threaded ends of the pins. Finally, the socket head cap screw 42 is screwed into the pin 40 sandwiching the washer 44 between the head of the cap screw 42 and the threaded end of the pin. The washers 44 and the head of the cap screw 42 are designed to limit the outward radial movement of the tread segments at the location of a shoulder 60 formed at the point where the diameter of the cavity 50 abruptly changes (see FIG. 3). Because the pins 40 are fixedly attached to the mold container top and bottom, and the cap screws 42 are fixedly attached to the pins 40, the cap screw prevents the tread segments from separating from the mold container top and bottom, when the top portion 12 of the mold is moved out of the way of the bottom portion 14.

The bottom tread segments 24 are installed in the container bottom 22 in the same manner as the top tread segments are installed in the container top as described immediately above. The completed mold 10 may then be installed into a tire press, as is known in the art. Bolt locations 62 are provided to facilitate installation in a press. Other bolt locations 63 are provided to facilitate moving the entire mold into and out of the press, or to another location.

As shown in FIG. 3, the mold 10 is in its fully open position, in which the tread segments are extended to their most radially outward position. In this position, the washers 44 and the head of the cap screw 42 meet with shoulder 60 in cavity 50 to prevent any further extension of the tread segments. However, the press continues to separate the mold top and bottom portions to provide the space needed to accept a tire for curing or to unload a tire which has already been cured. By raising only the top mold section 12, the press need only raise roughly half the of the components of the mold, unlike the prior art segmented mold of FIGS. 2A and 2B, which must raise a significant majority of the weight of the mold and container. Once the tire is installed within the mold, the tire press may be operated to close the mold, as shown in FIG. 4. An alignment dowel 64 insures proper alignment of the mold container top 16 with the mold container bottom 22.

In closing the mold, the tire press provides the force necessary to overcome the biasing force provided by the spring assemblies 38. Seating surfaces 65 on the top tread segments 18 mate with seating surface 66 on the top mold sidewall plate 20 to form seating joint 72, and seating surfaces 68 on the bottom tread segments 24 mate with seating surface 70 on the bottom mold sidewall plate 26 to form seating joint 74, thereby properly positioning the tread segments with respect to the mold sidewall plates. The seating joints 72 and 74 limit the inward radial movement of the top and bottom tread segments.

Seating joints 72 and 74 are disposed normal (generally perpendicular or 90°) to the surface of a tire at the location of the S-diameter of the mold. Other mating angles greater than or less than 90° are contemplated. It is important, however, that the seating joints 72 and 74 be formed by blunt portions of the tread segments and the mold sidewall plates, unlike the prior art retread matrix mold previously mentioned, so that secure seating will occur. Seating joints 72, 74 thereby provide a smooth, continuous molding surface for the tire formed by the top and bottom tread segments and the top and bottom mold sidewall plates. Unlike the prior art segmented mold shown in FIGS. 2A and 2B, the seating joints 72, 74 formed by the mating of surface 65 with 66, and surface 68 with 70, respectively, can be located lower down the sidewall of the tire, beyond the tire shoulder (see FIG. 4).

Because the tread segments are slidably and angularly mounted on the mold container top and bottom, vertical movement of the mold container top, with respect to the bottom, from a closed position (FIG. 4) to a partially open position (FIG. 3), is translated into both upward vertical movement of the tread segments and outward radial movement of the tread segments away from the axis of rotation of the tire. Unlike the prior art segmented mold shown in FIGS. 2A and 2B, because the segmented mold 10 is split into top and bottom tread segments 18 and 24, the tread segments need only extend radially outward a sufficient distance to clear the tread depth of the tire, in order to remove the tire from the mold.

The top tread segments 18 slide upon frustoconical surface 76 of the mold container top 16, and the bottom tread segments 24 slide upon frustoconical surface 78 of the mold container bottom. The frustoconical surfaces 76 and 78 are parallel to the axes 51 and 53 of the pin cavity and spring cavities respectively. Each of the top and bottom tread segments is provided with a plurality of circumferential grooves 80 which communicate with holes in the tread segments to provide exhaust vents between the interior of the mold and the outside environment. To facilitate ease of movement of the tread segments with respect to the mold container, the frustoconical surfaces 76 and 78 of the mold container top and bottom, respectively, may be coated or plated with nickel, a nickel alloy, or any other suitable material.

With the above-described configuration of components, the inventive mold provides free-floating segments, which are loosely guided initially by the pins 40 and the spring seats within the tread segments and the container top and bottom, and are finally guided by the frustoconical surfaces 76 and 78 and the seating surfaces (65, 66, 68, 70) to a precise and accurate closed position as shown in FIG. 4.

Also as shown in FIG. 4, the top and bottom tread segments 18 and 24 do not necessarily separate at the mold centerline $C_L$. Instead, the mold top and bottom tread segments part at parting surfaces 84 and 85, respectively, which mate at a position which is slightly off center of the mold centerline $C_L$. One or both of the surfaces 84 and 85 may be provided with a coated or plated surface which facilitates slidable movement to reduce wear on the tread segments.

The off-centerline parting of the top and bottom tread segments permits the tire designer greater freedom in designing a tread. For example, if the top and bottom tread segments parted at the mold (and tread) centerline $C_L$, such a mold would not be appropriate for curing a tire having a tread with a central groove running about the circumference of the tire at the tread centerline, because it is undesirable to have a mold parting line occur in a groove portion of a tire tread. This off-center parting arrangement results in a weight distribution which is more or less equal for the top and bottom mold sections 12 and 14.

As shown in FIGS. 8 and 9, in the preferred embodiment, nine top tread segments 18 and nine bottom tread segments 24 are employed, although it is contemplated that fewer or more than nine segments may be used. The bottom tread segments 24 meet at junctions 86, and the top tread segments meet at junctions 88. Also as shown in FIGS. 8 and 9, the tread segments are not equally divided into equal arcuate segments of 40°. Arcuate segments of unequal lengths as shown permit variability of segment arc-lengths to enhance tread design parameters.

FIG. 8 is a plan view of the layout of the bottom tread segments taken along the line of sight A—A of FIG. 3, and FIG. 9 is a plan view of the layout of the top tread segments taken along the line of sight B—B of FIG. 3. Accordingly, when the bottom tread segments mate with the top tread segments when the mold is in the closed position (FIG. 4), none of the junctions 86 aligns with or directly overlies any of the junctions 88. This type of arrangement helps maintain the alignment of the top tread segments with the bottom tread segments when the mold is in the closed position.

Accordingly, the preferred embodiment of a center split segmented mold for curing pneumatic tires has been described. With the foregoing description in mind, however, it is understood that this description is made only by way of example, that the invention is not limited to the particular embodiments described herein, and that various rearrangements, modifications and substitutions may be implemented without departing from the true scope of the invention as hereinafter defined by the following claims and their equivalents.

We claim:

1. A tire mold for completely curing an uncured tire, comprising;

a top mold section and a bottom mold section separable from said top mold section about a mold centerline, said top mold section moveable with respect to said bottom mold section from an open position to a closed position;

said top mold section comprising a container top which contains a plurality of arcuate top tread segments arranged in a first circular pattern about a first axis passing through a center of said first circular pattern and extending generally perpendicular thereto, each of said arcuate top segments coupled to said container top by a top biasing mechanism which forces each of said arcuate top segments radially outward from said first axis when said mold is in said open position;

said bottom mold section comprising a container bottom which contains a plurality of arcuate bottom tread segments arranged in a second circular pattern generally parallel to said first circular pattern, said first axis passing through a center of said second circular pattern, each of said arcuate bottom tread segments coupled to said container bottom by a bottom biasing mechanism which forces each of said arcuate bottom segments radially outward from said first axis when said mold is in said open position;

said top mold section including a top sidewall portion and said bottom mold section including a bottom sidewall portion, said top and bottom sidewall portions and said top and bottom tread segments being heated, said top sidewall portion mating with said top tread segments and said bottom sidewall portion mating with said bottom tread segments at respective seating joints which limit inward radial movement of said top and bottom tread segments toward said first axis;

wherein at least two of said arcuate top tread segments and at least two of said arcuate bottom tread segments are of unequal arc length, and wherein said plurality of arcuate top tread segments meet at a first set of junctions when said mold is in said closed position, and said plurality of arcuate bottom tread segments meet at a second set of junctions when said mold is in said closed position, none of said first set of junctions aligning with any of said second set of junctions when said mold is in said closed position.

2. The tire mold of claim 1, wherein said top and bottom sidewall portions each comprise a replaceable plate attached to said container top and container bottom, respectively.

3. The tire mold of claim 1, wherein said seating joints are disposed generally perpendicular to inner surfaces of said sidewall portions.

4. The tire mold of claim 1, wherein said plurality of arcuate top tread segments equals nine segments and wherein said plurality of bottom tread segments equals nine segments.

5. The tire mold of claim 1, wherein said top and bottom tread segments mate when said mold is in a closed position in a plane which is offset from a plane containing said mold centerline.

6. The tire mold of claim 5, wherein said top and bottom biasing mechanisms comprise at least two spring assemblies for each of said top and bottom tread segments, said mold further comprising an alignment pin for each of said top and bottom tread segments, said alignment pins aligning each of said bottom tread segments with said container bottom, and aligning each of said top tread segments with said container top.

7. The tire mold of claim 6, wherein said at least two spring assemblies and said at least one pin are disposed in parallel but not coaxial relationship with each other.

8. The tire mold of claim 6, wherein said top and bottom tread segments are constructed of aluminum and said mold container top and bottom are constructed of steel.

9. The tire mold of claim 6, wherein said at least two spring assemblies each comprises a cylindrical spring surrounded by a cylindrical sleeve, and said at least one pin is fixedly attached at a first end to said container.

10. The tire mold of claim 9, wherein a second end of said pin opposite said first end limits the outward radial movement of the tread segments away from said first axis.

11. The tire mold of claim 7, wherein said container top and container bottom are provided with frustoconical surfaces upon which slide said top tread segments and said bottom tread segments, respectively, said frustoconical surfaces being disposed generally parallel to said spring assemblies and said pins.

12. The tire mold of claim 11, wherein said frustoconical surfaces are provided with a coated or plated surface which facilitates slidable movement of said tread segments with respect thereto.

13. The tire mold of claim 12, wherein said coated or plated surface includes nickel.

* * * * *